United States Patent [19]

Simbulan

[11] Patent Number: 5,029,612

[45] Date of Patent: Jul. 9, 1991

[54] AUXILIARY WATER SUPPLY BARREL

[76] Inventor: Virgilio M. Simbulan, 7167 Latrobe Cir., San Diego, Calif. 92139

[21] Appl. No.: 600,707

[22] Filed: Oct. 22, 1990

[51] Int. Cl.⁵ .............................................. E03B 11/00
[52] U.S. Cl. .................................... 137/592; 137/587; 137/216; 220/628
[58] Field of Search ...................... 220/628, 635, 636; 137/571, 592, 587, 216

[56] References Cited

U.S. PATENT DOCUMENTS

| | | | |
|---|---|---|---|
| 3,095,893 | 7/1963 | Martin | 137/216 |
| 3,186,607 | 6/1965 | Lubenow | 220/628 |
| 4,700,734 | 10/1987 | McCauley | 137/571 |
| 4,718,452 | 1/1988 | Martin | 137/587 |

FOREIGN PATENT DOCUMENTS 992475   7/1976   Canada .............................. 220/628

*Primary Examiner*—A. Michael Chambers
*Attorney, Agent, or Firm*—Charles C. Logan, II

[57] ABSTRACT

An emergency water supply barrel that would be connected to one of the water faucets of a house. The water supply barrel has an inlet port and an outlet port formed adjacent the top end of the barrel. A tubular pipe within the barrel has its top end connected to the inlet port and its bottom end located adjacent the bottom wall of the barrel. A hose would normally be connected to the outlet port of the barrel and water delivered through this hose would come from the top of the barrel while new water entering the barrel would be delivered to its bottom end to prevent stagnant water from being stored in the barrel.

3 Claims, 1 Drawing Sheet

AUXILIARY WATER SUPPLY BARREL

BACKGROUND OF THE INVENTION

The invention relates to a water storage container and more specifically to an emergency water supply barrel.

Presently most home owners do not maintain a supply of storage water that they can rely upon in an emergency situation. If an earthquake occurs and the city water pressure is cut off, people would not have a source of water in their homes. Likewise, when a local water main ruptures and the city must stop the water supply to areas of the city, most people will not have a source of drinkable water.

It is an object of the invention to provide a novel emergency water supply barrel that would always be hooked up to one of the water faucets of the house to insure that they always have an emergency source of drinkable water.

It is another object of the invention to provide a novel emergency water supply barrel that can be economically manufactured and marketed.

It is also an object of the invention to provide a novel emergency water supply barrel that is stable and cannot be tipped over easily.

It is an additional object of the invention to provide a novel emergency water supply barrel that has mating structure on its top and bottom walls that will allow two or more barrels to be stacked on top of each other.

SUMMARY OF THE INVENTION

The novel emergency water supply barrel has been designed to supply a family with water for a short period time when they have lost the source of water to their home.

The emergency water water supply barrel has a tubular housing whose top and bottom ends are closed respectively by a top wall and a bottom wall. An inlet port and an outlet port is formed adjacent the top ends of the tubular housing. A tubular pipe is vertically oriented within the barrel and its top end is connected to the inlet port and its bottom end is located adjacent to the bottom wall. An anti-siphon aperture is formed in the tubular pipe adjacent its top end.

The emergency water supply barrel would normally be continuously hooked up to an existing faucet of a house. A conventional water hose would have its one end connected to the house faucet and its other end connected to the inlet port of the barrel. Another conventional water hose would have its one end connected to the outlet port of the barrel.

Normally the water faucet of the house would have its valve open so that as water is being used out of the emergency water supply barrel, fresh water flows into the bottom of the barrel and the water being used comes out of the top. This system provides a constant water circulation every time water is used and prevents the water in the barrel from becoming stagnant. A drain outlet port is also formed adjacent the bottom end of the barrel and it would be used on occasions when it is desired to empty the water from the barrel.

The water supply barrel would be preferrably formed of plastic material. The material would have to be strong enough to resist the internal build up of pressure inside of the barrel that would be equal to the water supply pressure. The thickness of the lower portion of the barrel would have to be sufficient to prevent the barrel from collapsing when it is full of water. The barrel would be coned shape to make it more stable. The top and botom walls of the water supply barrel have mating structure that allows two or more barrels to be stacked upon each other.

DESCRIPTION OF THE PREFERRED EMBODIMENT

Figure 1:
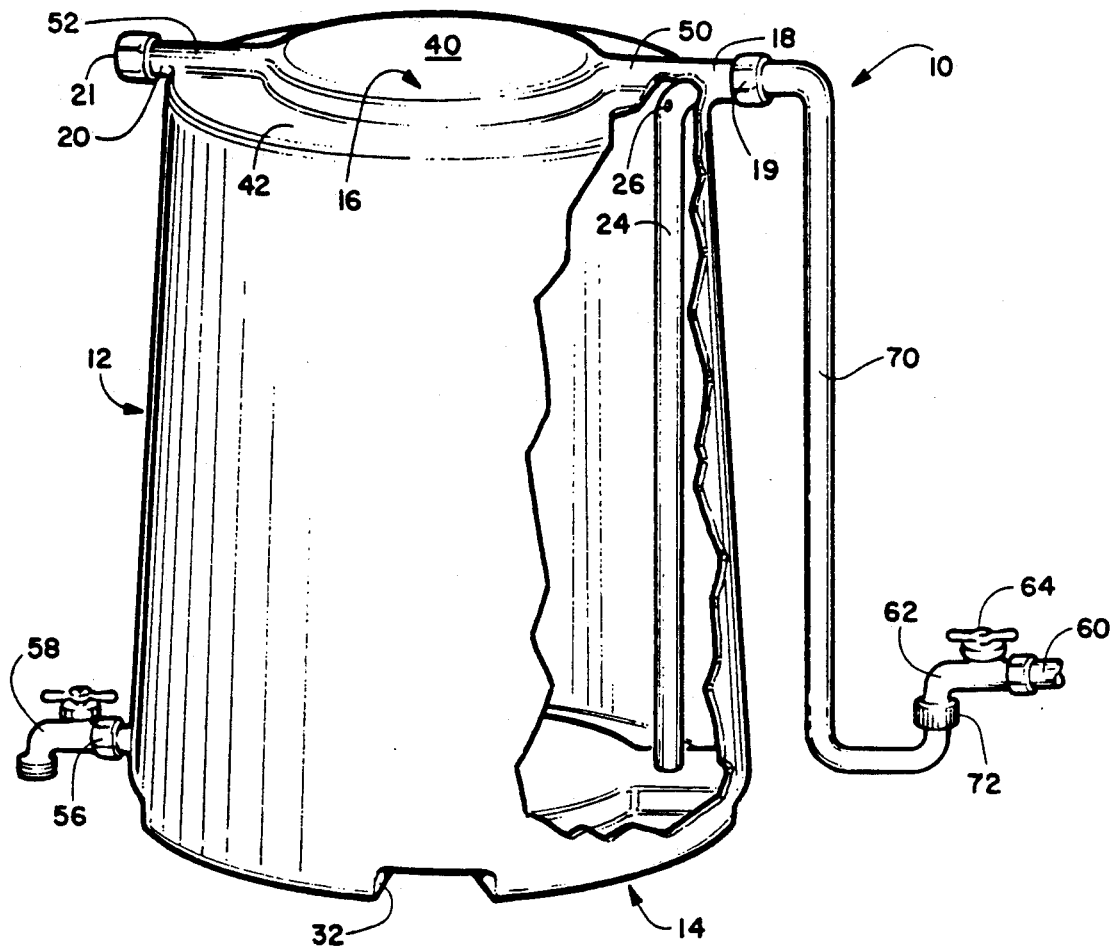
FIG. 1 is a front perspective view of applicant's novel emergency water supply barrel.
Figure 2:
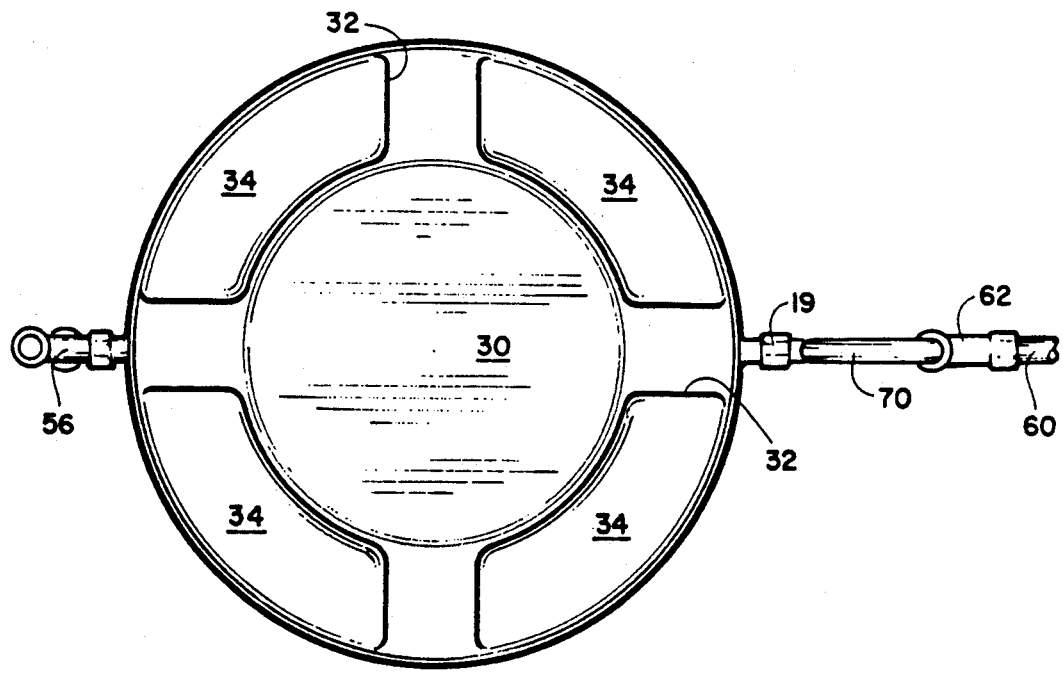
FIG. 2 is a bottom plan view of FIG. 1.

The novel emergency water supply barrel will now be described by referring to FIGS. 1 and 2 of the drawing. The water barrel is generally designated numeral 10.

Water barrel 10 has a tubular housing 12, a bottom wall 14 and a top wall 16. An inlet port 18 and an outlet port 20 are formed adjacent the top end of the barrel. These ports have respectively hose couplings 19 and 21.

A tubular pipe 24 has its top end connected to inlet port 18. Its bottom end is located adjacent bottom wall 14. An antisiphon aperture 26 is formed in tubular pipe 24 adjacent its top end.

Bottom wall 14 has a recessed central portion 30. A plurality of radially extending channels 32 communicate with central portion 30 and form arcuate shaped support portions 34 around the periphery of bottom wall 14.

Top wall 16 has a central raised boss portion 40. An annular portion 42 surrounds the central raised boss portion at a lower height. Radially extending tunnel portions 50 and 52 are connected respectively to inlet port 18 and outlet port 20.

A drain outlet port 56 has a faucet 58 connected thereto and would be used at anytime it is desirable to empty water barrel 10.

In use, a water supply pipe 60 exists in your normal home. It would have a faucet 62 having a valve 64 for turning it on and off. A conventional water hose 70 would have a coupling 72 on its one end and it would be connected to faucet 62. The other end of the water hose 70 would be connected to coupling 19. Another hose not shown would have its one end connected to coupling 21.

What is claimed is:

1. An auxiliary water supply barrel comprising:
    a vertically oriented tubular housing having a top end and a bottom end, said top end being closed by a top wall, said bottom end being closed by a bottom wall;
    an inlet port formed adjacent the top end of said tubular housing for detachably connecting one end of a water hose, said inlet port extending radially outwardly from said tubular housing;
    an outlet port formed adjacent the top end of said tubular housing for detachably connecting one end of a water hose, said outlet port extending radially outwardly from said tubular housing;
    a vertically oriented tubular pipe having a top end and a bottom end, said tubular pipe being positioned within said tubular housing with its top end being connected to said inlet port, the bottom end of said tubular pipe being located adjacent the bottom wall of said tubular housing;

said top wall having a central raised boss portion that is surrounded by an annular portion of reduced height, diametrically opposed radially extending tunnel portions are formed in said top wall and they are connected respectively to said inlet port and said outlet port, said tunnel portions extending upwardly from said annular portion of reduced height;

said bottom wall has a recessed central portion to which four radially extending channels are connected, arcuate shaped support portions are formed around the periphery of said bottom wall between said respective radially extending channels, the respective top and bottom walls are formed in such a manner that the radially extending tunnel portions align with two of the radially extending channels so that one or more of the water supply barrels may be stacked upon one another; and a drain outlet port formed adjacent the bottom end of said tubular housing, said drain outlet port extending radially outwardly from said tubular housing.

2. An auxiliary water supply barrel as recited in claim 1 further comprising an anti-siphon aperture in said tubular pipe adjacent its top end.

3. An auxiliary water supply barrel as recited in claim 1 wherein said tubular housing is cone shaped with a larger diameter at its bottom end.

* * * * *